United States Patent
Han et al.

(10) Patent No.: US 9,343,232 B2
(45) Date of Patent: May 17, 2016

(54) CONDUCTIVE PASTE COMPOSITION FOR EXTERNAL ELECTRODE AND MULTILAYER CERAMIC ELECTRONIC COMPONENT INCLUDING THE SAME

(71) Applicant: SAMSUNG ELECTRO-MECHANICS CO., LTD., Suwon (KR)

(72) Inventors: Jae Hwan Han, Suwon (KR); Byoung Jin Chun, Suwon (KR); Kyung Pyo Hong, Suwon (KR); Hyun Hee Gu, Suwon (KR); Byung Jun Jeon, Suwon (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 160 days.

(21) Appl. No.: 14/061,077

(22) Filed: Oct. 23, 2013

(65) Prior Publication Data

US 2015/0022940 A1  Jan. 22, 2015

(30) Foreign Application Priority Data

Jul. 16, 2013  (KR) .................. 10-2013-0083687

(51) Int. Cl.
*H01G 4/30* (2006.01)
*H01G 4/008* (2006.01)
*H01B 1/22* (2006.01)
(Continued)

(52) U.S. Cl.
CPC ................ *H01G 4/008* (2013.01); *H01B 1/22* (2013.01); *H01G 4/2325* (2013.01); *H01G 4/30* (2013.01); *H01G 4/12* (2013.01)

(58) Field of Classification Search
CPC ........... H01G 4/30; H01G 4/12; H01G 4/008; H01G 4/005
USPC ........... 361/305, 303, 311–313, 306.1, 306.3, 361/321.1, 321.2, 301.4
See application file for complete search history.

(56) References Cited

U.S. PATENT DOCUMENTS

| | | | | |
|---|---|---|---|---|
| 7,368,070 B2* | 5/2008 | Akimoto | ............... | H01C 1/148 252/512 |
| 2008/0073108 A1* | 3/2008 | Saito | ..................... | H01G 4/005 174/256 |

(Continued)

FOREIGN PATENT DOCUMENTS

| | | |
|---|---|---|
| CN | 102867564 A | 1/2013 |
| JP | 11-80818 | 3/1999 |

(Continued)

OTHER PUBLICATIONS

Korean Office Action issued Mar. 31, 2014 in Korean Application No. 10-2013-0083687.

(Continued)

*Primary Examiner* — Nguyen T Ha
(74) *Attorney, Agent, or Firm* — McDermott Will & Emery LLP

(57) ABSTRACT

There is provided a conductive paste composition for an external electrode, the conductive paste composition including a polymer resin, spherical first conductive metal particles included in the polymer resin and being hollow in at least a portion thereof, and second conductive metal particles of a flake shape included in the polymer resin and being hollow in at least a portion thereof.

12 Claims, 2 Drawing Sheets

(51) Int. Cl.
*H01G 4/232* (2006.01)
*H01G 4/12* (2006.01)

(56) References Cited

U.S. PATENT DOCUMENTS

2008/0081200 A1* 4/2008 Katsube ............... H01G 4/2325
                                                        428/457
2013/0009515 A1   1/2013 Kim et al.

FOREIGN PATENT DOCUMENTS

| JP | 2009-46708 | 3/2009 |
| JP | 2011-233452 | 11/2011 |
| KR | 10-2001-0001640 | 1/2001 |
| KR | 10-2011-0121572 | 11/2011 |
| KR | 10-2012-0089460 | 8/2012 |
| WO | WO 2011/022188 | 2/2011 |

OTHER PUBLICATIONS

Japanese Office Action dated Jun. 30, 2015 in corresponding Japanese Patent Application No. 2013-213510.

Chinese Office Action issued in Chinese Application No. 201310530263.9 dated Feb. 1, 2016, with English Translation.

* cited by examiner

CONDUCTIVE PASTE COMPOSITION FOR EXTERNAL ELECTRODE AND MULTILAYER CERAMIC ELECTRONIC COMPONENT INCLUDING THE SAME

CROSS-REFERENCE TO RELATED APPLICATION

This application claims the benefit of Korean Patent Application No. 10-2013-0083687 filed on Jul. 16, 2013, with the Korean Intellectual Property Office, the disclosure of which is incorporated herein by reference.

BACKGROUND OF THE INVENTION

1. Field of the Invention

The present invention relates to a conductive paste composition for an external electrode and a multilayer ceramic electronic component including the same.

2. Description of the Related Art

Examples of electronic components using a ceramic material include a capacitor, an inductor, a piezoelectric element, a varistor, a thermistor, and the like.

A multilayered ceramic capacitor (MLCC) among the ceramic electronic components includes a ceramic element formed of a ceramic material, internal electrodes formed in the ceramic element, and external electrodes mounted on a surface of the ceramic element to be electrically connected to the internal electrodes, and has advantages such as a small size, high capacitance, ease of mounting, and the like.

Due to the advantages as described above, the multilayered ceramic capacitor is used as a chip type condenser mounted on a printed circuit board of several electronic products such as computers, personal digital assistants (PDAs), cellular phones, and the like to perform an important role of charging or discharging electricity and may have various sizes and stacked forms depending on use and capacity.

Recently, in accordance with miniaturization of the electronic products, it is demanded to allow the multilayered ceramic capacitor to have a subminiature size and ultra high capacitance. To this end, the multilayered ceramic capacitor having a structure in which a larger number of dielectric layers and internal electrodes are stacked has been manufactured, wherein the dielectric layer and the internal electrode have a thin thickness.

Since many functions in the field requiring high reliability, for example, automobiles, medical devices, or the like, are digitalized, the subminiaturized and ultra high capacitance multilayered ceramic capacitor is required to have the high reliability.

Examples of factors causing problems in the above-mentioned high reliability may include crack occurrence in an external electrode layer due to external impacts, permeation of plating liquid into the ceramic element through the external electrode layer at the time of performing a plating process, and the like.

Specifically, since a chip in which bending cracks do not occur after a bending test is performed thereon is in demand, it may be difficult to guarantee reliability by using a copper (Cu) paste generally used at the time of firing the external electrode.

The following Related Art Document relates to a conductive paste for an external electrode and a multilayer ceramic electronic component having an external electrode formed using the same. However, the following Related Art Document does not disclose hollow metal particles.

RELATED ART DOCUMENT

Korean Patent Laid-Open Publication No. 2011-0121572

SUMMARY OF THE INVENTION

An aspect of the present invention provides a conductive paste for an external electrode, for manufacturing a chip in no bending cracks occur, and a multilayer ceramic electronic component including the same.

According to an aspect of the present invention, there is provided a conductive paste composition for an external electrode, the conductive paste composition including: a polymer resin; spherical first conductive metal particles included in the polymer resin and being hollow in at least a portion thereof; and second conductive metal particles of a flake shape included in the polymer resin.

All the first conductive metal particles may be hollow.

At least a portion of the second conductive metal particles may be hollow.

All the first and second conductive metal particles may be hollow.

The first conductive metal particle may be at least one selected from a group consisting of silver (Ag), copper (Cu), and aluminum (Al).

The second conductive metal particle may be at least one selected from a group consisting of silver (Ag), copper (Cu), and aluminum (Al).

The first conductive metal particle may have a size of 0.1 to 1.5 μm.

A content of the second conductive metal particles is 10 to 50%.

According to another aspect of the present invention, there is provided a conductive paste composition for an external electrode, the conductive paste composition including: a polymer resin; spherical first conductive metal particles included in the polymer resin; and second conductive metal particles of a flake shape included in the polymer resin and being hollow in at least a portion thereof.

All the first conductive metal particles may be hollow.

All the second conductive metal particles may be hollow.

According to another aspect of the present invention, there is provided a multilayer ceramic electronic component, including: a ceramic element having a plurality of dielectric layers stacked therein; a plurality of first and second internal electrodes formed on at least one surface of the dielectric layer and alternately exposed through both end surfaces of the ceramic element; and first and second external electrodes formed on the both end surfaces of the ceramic element and electrically connected to the first and second internal electrodes, wherein the first and second external electrodes include a polymer resin, spherical first conductive metal particles included in the polymer resin and being hollow in at least a portion thereof, and second conductive metal particles of a flake shape included in the polymer resin.

All the first conductive metal particles may be hollow.

At least a portion of the second conductive metal particles may be hollow.

The multilayer ceramic electronic components may further include plated layers formed on surfaces of the first and second external electrodes.

The plated layer may be configured of nickel (Ni) plated layers formed on the surfaces of the first and second external electrodes, and tin (Sn) plated layers formed on surfaces of the nickel-plated layers.

A content of the second conductive metal particles may be 10 to 50%.

According to another aspect of the present invention, there is provided a multilayer ceramic electronic component, including: a ceramic element having a plurality of dielectric layers stacked therein a plurality of first and second internal electrodes formed on at least one surface of the dielectric layer and alternately exposed through both end surfaces of the ceramic element; and first and second external electrodes formed on both end surfaces of the ceramic element and electrically connected to the first and second internal electrodes, wherein the first and second external electrodes include a polymer resin, spherical first conductive metal particles included in the polymer resin, and second conductive metal particles of a flake shape included in the polymer resin and being hollow in at least a portion thereof.

All the first conductive metal particles may be hollow.

All the second conductive metal particles may be hollow.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
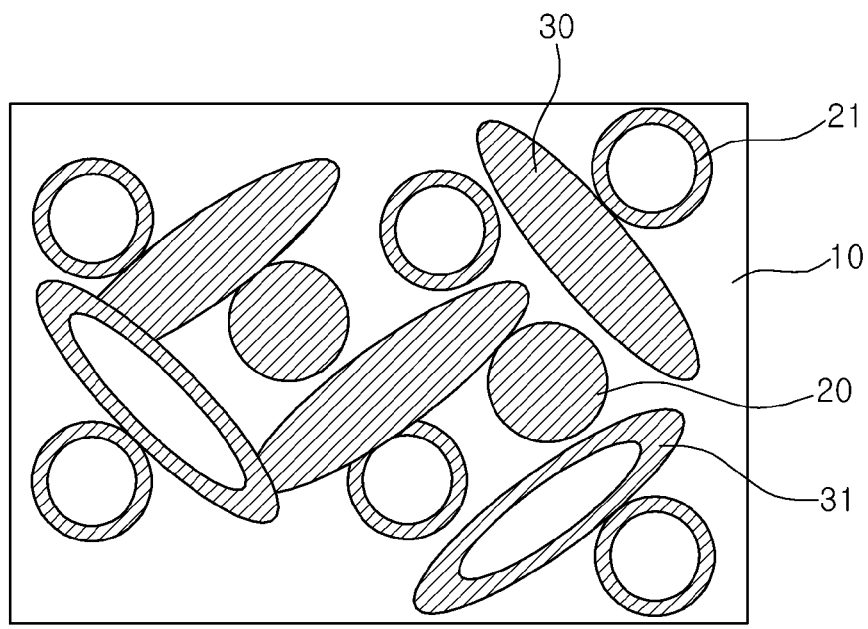
FIG. 1 is a schematic cross-sectional view of a conductive paste for an external electrode according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

An aspect ratio used in embodiments of the present invention refers to a length ratio obtained by dividing a length of a long axis by a length of a short axis (a length of a long axis/a length of a short axis).

A ceramic electronic component according to an embodiment of the present invention is provided. An example of the ceramic electronic component according to an embodiment of the present invention includes a multilayered ceramic capacitor, an inductor, a piezoelectric element, a varistor, a chip resistor, a thermistor, and the like. Hereinafter, the multilayered ceramic capacitor will be described as an example of the ceramic electronic components.

FIG. 1 is a schematic cross-sectional view of a conductive paste for an external electrode according to an embodiment of the present invention.

Referring to FIG. 1, a conductive paste composition for an external electrode according to an embodiment of the present invention may include a polymer resin 10, spherical first conductive metal particles 20 and 21 included in the polymer resin 10 and being hollow in at least a portion thereof, and second conductive metal particles 30 and 31 having a flake shape included in the polymer resin 10 and being hollow in at least a portion thereof.

In order to improve bending cracks resistance of the multilayered ceramic capacitor, the polymer resin 10 having good flexibility may be used.

The polymer resin 10 may be an epoxy resin, but is not limited thereto.

At least a portion of the first conductive metal particles 20 and 21 or the second conductive metal particles 30 and 31 may be hollow particles.

In the case in which at least a portion of the first conductive metal particles 20 and 21 or the second conductive metal particles 30 and 31 may be hollow therein, the metal particle being hollow therein may perform a buffering operation, such that occurrence of bending cracks may be further suppressed as compared to a case in which general metal particles are used.

In addition, the hollow metal particle may consume a raw material in a reduced amount thereof as compared to the general metal particle, such that production costs may be decreased.

Further, all of the first conductive metal particles 21 or the second conductive metal particles 31 may be hollow.

Specifically, when manufacturing the conductive paste for an external electrode using hollow metal particles, that is, both the first conductive metal particle 21 and the second conductive metal particle 31 being hollow, the buffering operation may be significantly increased, such that the occurrence of bending cracks may be prevented.

The first conductive metal particles 20 and 21 may have a spherical shape having an aspect ratio of 1.45 or less.

Since the first conductive metal particles 20 and 21 have the spherical shape, the occurrence of bending cracks may be suppressed regardless of a direction in which the first conductive metal particles 20 and 21 are arranged in the polymer resin 10.

The second conductive metal particles 30 and 31 may have a flake shape having an aspect ratio greater than 1.45.

Since the conductive paste for an external electrode according to the embodiment of the present invention needs to have conductivity, the conductive paste may have higher conductivity when the second conductive metal particles 30 and 31 have a flake shape.

According to the embodiment of the present invention, the first conductive metal particles 20 and 21 or the second conductive metal particles 30 and 31 may be at least one selected from a group consisting of silver (Ag), copper (Cu), and aluminum (Al), but is not limited thereto.

The conductive metal particles may be included in the polymer resin 10 and may be formed of a metal having high conductivity.

According to the embodiment of the present invention, the first conductive metal particles 20 and 21 may have a grain size of 0.1 to 1.5 µm.

Figure 2:
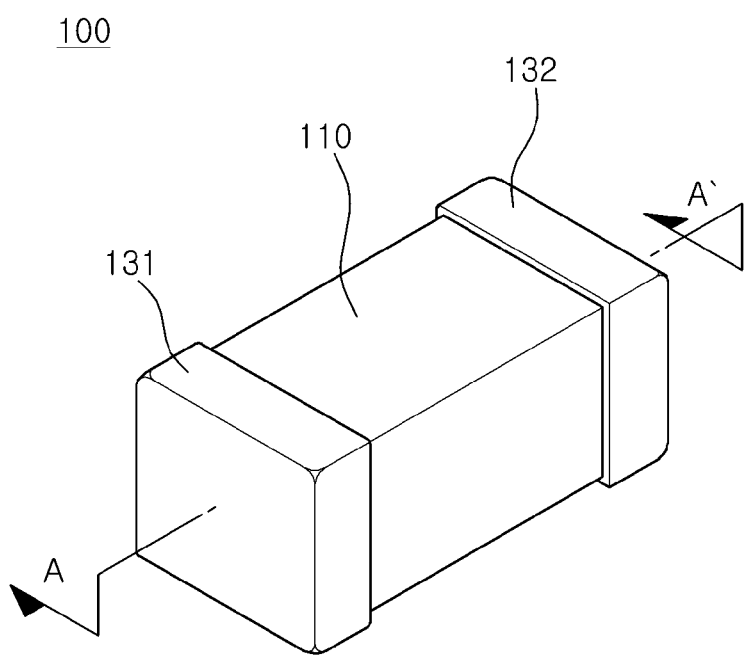
FIG. 2 is a perspective view schematically showing a multilayered ceramic capacitor according to another embodiment of the present invention.
Figure 3:
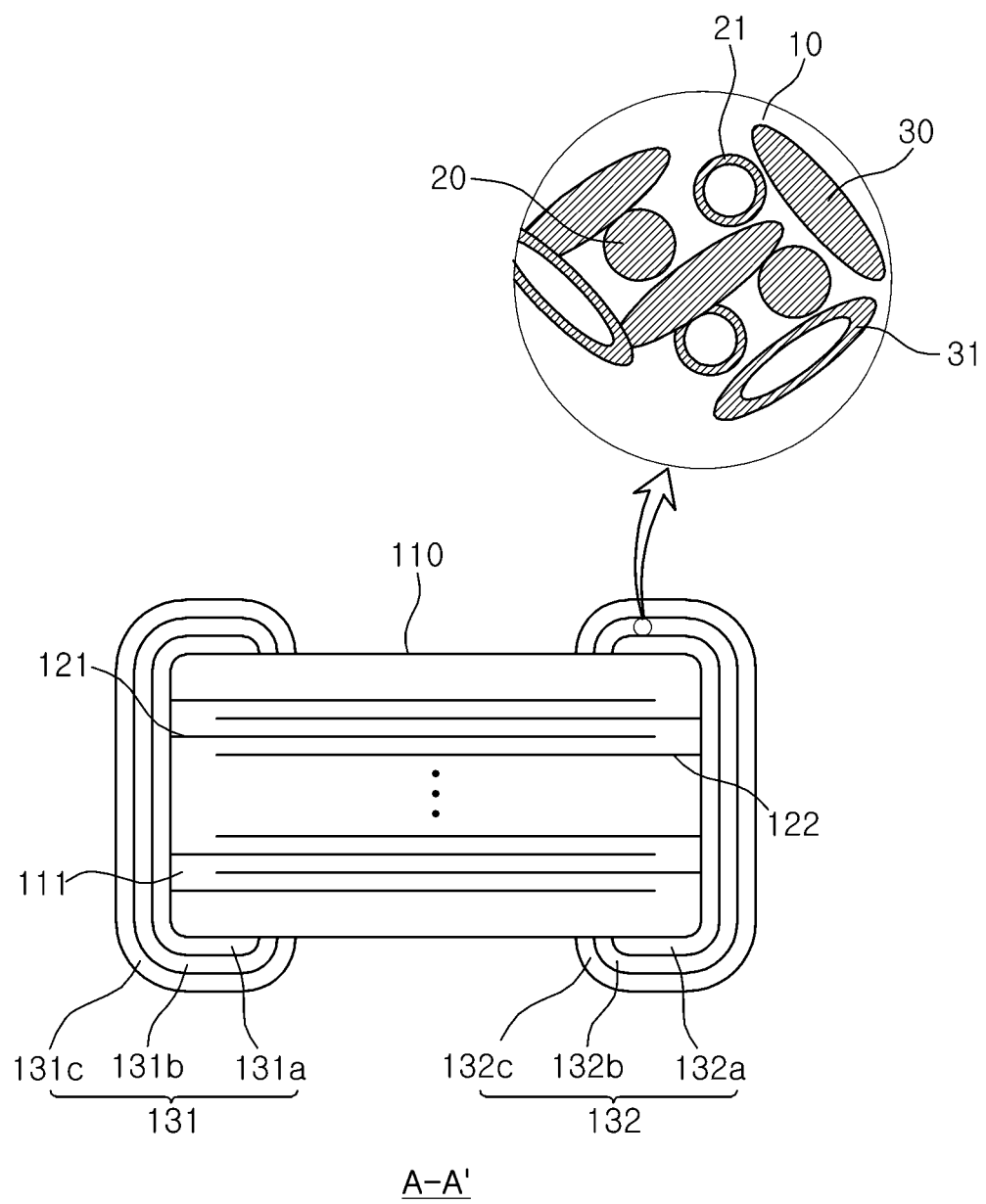
FIG. 3 is a cross-sectional view taken along line A-A' of FIG. 2.

FIG. 2 is a perspective view schematically showing a multilayered ceramic capacitor 100 according to another embodiment of the present invention and FIG. 3 is a cross-sectional view taken along line A-A' of FIG. 2.

Referring to FIGS. 2 and 3, a multilayered ceramic capacitor 100 according to another embodiment of the present invention may include a ceramic element 110 having a plurality of dielectric layers 111 stacked therein, a plurality of first and second internal electrodes 121 and 122 formed on at least one surface of the dielectric layer 111, first and second external electrodes 131 and 132 formed both end surfaces of the ceramic element 110 and electrically connected to the first and second internal electrodes 121 and 122.

The ceramic element 110 may be formed by stacking and then firing the plurality of dielectric layers 111, wherein the respective dielectric layers 111 adjacent to each other may be integrated so as not to confirm a boundary therebetween without using a scanning electron microscope (SEM).

In addition, the ceramic element 110 may generally have a rectangular parallelepiped shape, but the present invention is not limited thereto.

In addition, the ceramic element 110 is not limited in view of a dimension thereof, but it may be configured in the size of, for example, 0.6 mm×0.3 mm, to configure the multilayered ceramic capacitor having high capacitance.

In addition, an outermost surface of the ceramic element 110 may be provided with a dielectric cover layer (not shown) having a predetermined thickness, as necessary.

The dielectric layer 111 may contribute to the formation of capacitance of a capacitor, a thickness of one layer thereof may be optionally changed to meet a design of the capacitance of the multilayered ceramic capacitor 100, and one dielectric layer 111 may be configured to have a thickness of 0.1 to 1.0 μm after a firing process. However, the present invention is not limited thereto.

In addition, the dielectric layer 111 may include a high-k ceramic material and may include, for example, BaTiO3 based ceramic power, or the like. However, the present invention is not limited thereto.

An example of the $BaTiO_3$ based ceramic power includes $(Ba_{1-x}Ca_x)TiO_3$, $Ba(Ti_{1-y}Ca_y)O_3$, $(Ba_{1-x}Ca_x)(Ti_{1-y}Zr_y)O_3$, $Ba(Ti_{1-y}Zr_y)O_3$, or the like, in which Ca, Zr, or the like is partially used in $BaTiO_3$. However, the present invention is not limited thereto.

Meanwhile, the dielectric layer 111 may further include various ceramic additives such as transition metal oxide or carbide, rare-earth elements, magnesium (Mg), aluminum (Al), or the like, organic solvents, plasticizers, binders, dispersing agents, and the like, together with the ceramic powder.

The first and second internal electrodes 121 and 122 are formed on a ceramic sheet forming the dielectric layer 111 to be stacked on each other, and are then formed in the ceramic element 110, having one dielectric layer 111 interposed therebetween, through the firing process.

The above-mentioned first and second internal electrodes 121 and 122, a pair of electrodes having polarities different from each other, are disposed to face each other in a direction in which the dielectric layers 111 are stacked and are electrically insulated from each other by the dielectric layer 111 interposed therebetween.

In addition, the first and second internal electrodes 121 and 122 have respective one ends exposed through both end surfaces of the ceramic element 110, and the one ends of the first and second internal electrodes 121 and 122 alternately exposed through respective one end surfaces of the ceramic element 110 as described above are electrically connected to the first and second external electrodes 131 and 132, respectively.

The first and second internal electrodes 121 and 122 are formed of a conductive metal, and the first and second internal electrodes 121 and 122 formed of nickel (Ni), a nickel (Ni) alloy, or the like may be used. However, the present invention is not limited thereto.

When a predetermined level of voltage is applied to the above-mentioned first and second external electrodes 131 and 132, charges are accumulated between the first and second internal electrodes 121 and 122 facing each other. In this case, capacitance of the multilayered ceramic capacitor 100 is proportional to areas of the first and second internal electrodes 121 and 122 facing each other.

Hereinafter, a multilayered ceramic capacitor according to another embodiment of the present invention will be described while describing a method of manufacturing the multilayered ceramic capacitor according to another embodiment of the present invention.

First, a plurality of ceramic sheets are prepared.

The ceramic sheet, forming the dielectric layer 111 of the ceramic element 110, may be manufactured by mixing ceramic powder, polymer, and solvent with each other to thereby prepare slurry and allowing the slurry to be manufactured in a sheet form having a thickness of several μm using a doctor blade method or the like.

Next, patterns of the first and second internal electrodes 121 and 122 are formed by printing a conductive paste on at least one surface of the respective ceramic sheets to a predetermined thickness.

In this case, the first and second internal electrode patterns may be formed to be alternately exposed through both opposing end surfaces of the ceramic sheet.

In addition, a method of printing the conductive paste may use a screen printing method, a gravure printing method, or the like, but the present invention is not limited thereto.

Next, a multilayer body is formed by alternately stacking a plurality of ceramic sheets having the first and second internal electrodes 121 and 122 formed thereon and pressing the plurality of ceramic sheets in a stacking direction thereof such that the plurality of ceramic sheets and the first and second internal electrode patterns formed on the ceramic sheets are compressed.

Next, the multilayer body is cut to separate respective regions corresponding to single capacitors to form individual chip forms so that respective one ends of the first and second internal electrode patterns are alternately exposed through both end surfaces of the multilayer body.

Next, the multilayer body cut into an individual chip form is fired at a relatively high temperature, such that the ceramic element 110 having a plurality of first and second internal electrodes 121 and 122 is completed.

Next, copper films 131a and 132a are formed on surfaces to which the internal electrodes 121 and 122 of the ceramic element 110 are exposed.

Connectivity between the internal electrodes 121 and 122 and the external electrodes 131 and 132 may be secured by the copper films 131a and 132a.

The copper films 131a and 132a may be formed using a copper (Cu) paste.

The copper (Cu) paste may be produced by using copper (Cu) powder as conductive powder and mixing glass frit, an organic vehicle manufactured using a base resin and an organic solvent, and the like with the copper powder.

The above-mentioned copper paste is applied to the surfaces to which the internal electrodes 121 and 122 of the ceramic element 110 are exposed and is then fired to thereby form the copper films 131a and 132a.

In this case, since the copper films 131a and 132a may only need to implement contact with the internal electrodes 121 and 122, the copper paste may be applied so that a band thereof is relatively narrow in the ceramic element 110.

Next, polymer resin layers 131b and 132b may be formed on the copper films 131a and 132a.

The polymer resin layers 131b and 132b may be formed using a conductive paste for an external electrode, including a polymer resin 10, spherical first conductive metal particles 20 and 21 included in the polymer resin 10 and being hollow in at least a portion thereof, and second conductive metal particles 30 and 31 having a flake shape included in the polymer resin 10 and being hollow in at least a portion thereof.

The polymer resin 10 may be an epoxy resin, but is not limited thereto.

The conductive paste may be in a state in which epoxy and a hardening agent are dissolved in a solvent, and may be manufactured by adding the conductive metal particles to the dissolved epoxy.

By positioning the polymer resin layers 131b and 132b on the copper films 131a and 132a, bending crack resistance of the multilayered ceramic capacitor may be improved.

At least a portion of the first conductive metal particles 20 and 21 or the second conductive metal particles 30 and 31 may be hollow.

In the case in which at least a portion of the first conductive metal particles or the second conductive metal particles is hollow therein, the hollow metal particle may perform a buffering operation, such that occurrence of bending cracks may be further suppressed as compared to a case in which general metal particles are used.

In addition, the hollow metal particle may consume a raw material in an amount less than that of the general metal particle, such that production costs may be decreased.

Further, all of the first conductive metal particles 21 or the second conductive metal particles 31 may be hollow.

The first conductive metal particles 20 and 21 may have a spherical shape having an aspect ratio of 1.45 or less.

Since the first conductive metal particles 20 and 21 have the spherical shape, occurrence of bending cracks may be suppressed regardless of a direction in which the first conductive metal particles 20 and 21 are arranged in the polymer resin 10.

The second conductive metal particles 30 and 31 may have a flake shape having an aspect ratio greater than 1.45.

Since the conductive paste for an external electrode according to the embodiment of the present invention has conductivity, relatively high conductivity may be included therein when the second conductive metal particles 30 and 31 have a flake shape.

According to the embodiment of the present invention, the first conductive metal particles 20 and 21 or the second metal particles 30 and 31 may be at least one selected from a group consisting of silver (Ag), copper (Cu), and aluminum (Al), but is not limited thereto.

The conductive metal particles may be included in the polymer resin 10 and may be formed of a metal having relatively high conductivity.

Next, plating layers 131c and 132c may be further formed by performing a plating process on surfaces of the polymer resin layers 131b and 132b.

In this case, examples of materials used in performing the plating process may include nickel or tin, a nickel-tin alloy, or the like, and a nickel-plated layer and a tin-plated layer may be sequentially stacked on the polymer resin layers 131b and 132b.

The following table 1 illustrates whether or not a high temperature load and peaking occur depending on the contents of the spherical first conductive metal particles and the second conductive metal particles having the flake shape.

TABLE 1

| Content (%) of second conductive metal particles | High temperature load (125° C., 2 Vr) | Peaking |
|---|---|---|
| 2 | ○ | X |
| 3 | ○ | X |
| 5 | ○ | X |
| 10 | ○ | ○ |
| 30 | ○ | ○ |
| 40 | ○ | ○ |
| 50 | ○ | ○ |
| 60 | X | ○ |
| 70 | X | ○ |

The peaking refers to an applied form of the external electrode in which a thickness of applied edges is relatively thin and a thickness of a central portion thereof is relatively thick.

As shown in Table 1, in the case in which the content of the second conductive metal particles of the flake shape exceeds 50%, peaking occurs and a high temperature load occurs, and in the case in which the content of the second conductive metal particles is less than 10%, the peaking occurs, such that IR degradation and a short defect occur at the time of testing high temperature load reliability.

In addition, in the case in which 60% or more of the second conductive metal particles are included, deviations in thickness may occur at the time of applying the external electrode or a conductive path may be decreased due to the second conductive metal particles having the flake shape being disposed in a flat state.

Therefore, in the case in which the second conductive metal particles of 10% to 50% are included, the high temperature load due to the peaking may be prevented, and conductivity may be secured by preventing the decrease in the conductive path.

As set forth above, according to the embodiment of the present invention, by providing the conductive paste for an external electrode, including hollow metal particles, a buffering operation may be improved, such that the occurrence of bending cracks may be suppressed.

While the present invention has been shown and described in connection with the embodiments, it will be apparent to those skilled in the art that modifications and variations can be made without departing from the spirit and scope of the invention as defined by the appended claims.

What is claimed is:

1. A conductive paste composition for an external electrode, the conductive paste composition comprising:
   a polymer resin;
   spherical first conductive metal particles included in the polymer resin; and
   second conductive metal particles of a flake shape included in the polymer resin,
   wherein at least a portion of either of the first and second conductive metal particles is hollow.

2. The conductive paste composition for an external electrode of claim 1, wherein all the first conductive metal particles are hollow.

3. The conductive paste composition for an external electrode of claim 1, wherein all the first and second conductive metal particles are hollow.

4. The conductive paste composition for an external electrode of claim 1, wherein the first conductive metal particle is at least one selected from a group consisting of silver (Ag), copper (Cu), and aluminum (Al).

5. The conductive paste composition for an external electrode of claim 1, wherein the second conductive metal particle is at least one selected from a group consisting of silver (Ag), copper (Cu), and aluminum (Al).

6. The conductive paste composition for an external electrode of claim 1, wherein the first conductive metal particle has a size of 0.1 to 1.5 µm.

7. The conductive paste composition for an external electrode of claim 1, wherein a content of the second conductive metal particles is 10 to 50%.

8. A multilayer ceramic electronic component, comprising:
- a ceramic element having a plurality of dielectric layers stacked therein;
- a plurality of first and second internal electrodes formed on at least one surface of the dielectric layer and alternately exposed through both end surfaces of the ceramic element; and
- first and second external electrodes formed on the both end surfaces of the ceramic element and electrically connected to the first and second internal electrodes,
- wherein the first and second external electrodes include a polymer resin, spherical first conductive metal particles included in the polymer resin, and second conductive metal particles of a flake shape included in the polymer resin, and
- at least a portion of either of the first and second conductive metal particles is hollow.

9. The multilayer ceramic electronic components of claim 8, wherein all the first conductive metal particles are hollow.

10. The multilayer ceramic electronic components of claim 8, further comprising plated layers formed on surfaces of the first and second external electrodes.

11. The multilayer ceramic electronic components of claim 10, wherein the plated layer is configured of nickel (Ni) plated layers formed on the surfaces of the first and second external electrodes, and tin (Sn) plated layers formed on surfaces of the nickel-plated layers.

12. The multilayer ceramic electronic components of claim 8, wherein a content of the second conductive metal particles is 10 to 50%.

* * * * *